United States Patent
O'Neill

[11] 3,841,348
[45] Oct. 15, 1974

[54] FLUID PRESSURE CONTROL APPARATUS

[75] Inventor: Wilbur J. O'Neill, Severna Park, Md.

[73] Assignee: Westinghouse Electric Company, Pittsburgh, Pa.

[22] Filed: June 12, 1969

[21] Appl. No.: 832,671

[52] U.S. Cl. ................. 137/494, 137/38, 251/331, 251/336, 137/529
[51] Int. Cl. ........................ F16k 17/00, F16k 21/04
[58] Field of Search .......... 137/494, 495, 496, 63 R, 137/38, 43, 534, 455, 522, 523, 525.7, 525

[56] References Cited
UNITED STATES PATENTS

| 337,431 | 3/1886 | Pintsch | 251/336 X |
|---|---|---|---|
| 1,984,868 | 12/1934 | Deming | 137/494 X |
| 2,013,372 | 9/1935 | Work | 137/529 X |
| 2,318,721 | 5/1943 | Siver | 137/494 X |
| 2,616,442 | 11/1952 | Holmes | 137/495 X |
| 2,918,061 | 12/1959 | Gruget et al. | 137/506 X |
| 2,989,062 | 6/1961 | Gruget | 137/38 X |
| 3,175,473 | 3/1965 | Boteler et al. | 251/331 X |

FOREIGN PATENTS OR APPLICATIONS

| 25,175 | 3/1959 | Germany | 137/494 |
|---|---|---|---|

Primary Examiner—William R. Cline
Assistant Examiner—Robert J. Miller
Attorney, Agent, or Firm—D. Schron

[57] ABSTRACT

An underwater breathing system exhaust valve having an apertured movable diaphragm which closes against a valve seat. An adjustable spring member acts on the flexible diaphragm to maintain the valve closed. A weight connected to the flexible diaphragm will aid or oppose the spring in maintaining the valve closed, in accordance with the positional orientation of the valve.

7 Claims, 21 Drawing Figures

FLUID PRESSURE CONTROL APPARATUS

BACKGROUND OF THE INVENTION

1. Field of the Invention

The invention in general relates to fluid flow or pressure control, and particularly to a valve or regulator for an underwater breathing apparatus.

2. Description of the Prior Art

In underwater breathing systems, a diver is supplied with breathable gas at a certain pressure. When the diver is in the water it is desirable that the pressure of the gas being supplied to him be equal to the hydrostatic pressure acting on the diver's body at a certain reference point. When supplied with gas at that pressure the effort required by the diver to breath is minimized. For underwater work it is absolutely required to conserve as much as possible of the diver's total expendable energy so that it may be fully applied toward his specific task, or countering and emergency.

Several types of underwater breathing apparatus utilize spring loaded exhaust valves to maintain system pressure at a predetermined value relative to the ambient water pressure at the valve. This type of underwater breathing apparatus is known to be quite diver position sensitive and causes large ranges of undesirable inspiratory or expiratory effort. In addition to this expenditure of unnecessary energy, large inspiratory or expiratory pressures inhibit the proper cleansing of carbon dioxide from the diver's lungs.

It is therefore an object of the present invention to provide a fluid pressure control apparatus, particularly a gas pressure control apparatus, for an underwater breathing system, which apparatus will maintain the pressure of breathable gas in the system to within a certain range, to aid in diver breathing comfort.

SUMMARY OF THE INVENTION

Basically, a fluid flow or pressure control unit is provided and includes a chamber means which is connected to a source of pressurized fluid such as the breathing gas in an underwater breathing system. When open, an exit means allows for gas passage, for reducing the pressure in the system, and a closing means in the form of a flexible diaphragm is urged, by means of a spring member, to close the exit means. A weighting means is provided for varying the pressure urging the exit means to a closed position. In particular, there is a positional component of the weighting means which modifies the spring pressure in accordance with the positional orientation of the apparatus.

DESCRIPTION OF THE PREFERRED EMBODIMENT

Figure 1:
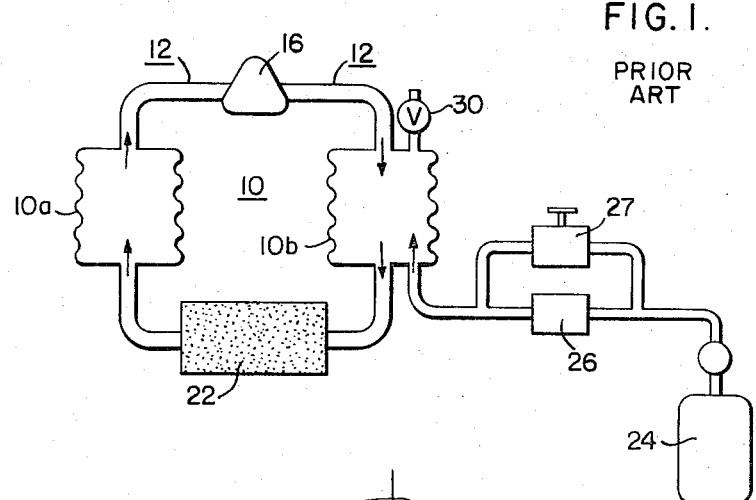
FIG. 1 is a schematic diagram illustrating one type of underwater breathing apparatus in which the present invention may be utilized.

The present invention finds utility in various pressure control applications however it is particularly well adapted for use in underwater breathing apparatus, of which there are three types, the open, semi-closed, and closed systems. Although not limited thereto, the present invention will be described with respect to the semi-closed system, schematically illustrated in FIG. 1.

The semi-closed apparatus includes a flexible breathing chamber means 10 having first and second sections 10a and 10b commonly referred to as an inhalation bag and an exhalation bag respectively. Passageway means 12 including oral-nasal mask 16 connects the inhalation bag 10a with the diver and connects the diver with the exhalation bag 10b, although other types of diver communications means, such as a mouthpiece with one way check valves, may be commonly utilized. The flexible breathing bags are also interconnected through a carbon dioxide absorbent means 22.

A source of breathable gas 24 provides a breathable gas to one of the breathing bags, for example exhalation bag 10b by means of an arrangement including a flow orifice 26 which governs the flow rate of gas into the system, and a purge valve 27 for quickly admitting large quantities of gas to the system when activated by the diver. Exhaust valve 30 is connected to breathing bag 10b and when the pressure in the system, as evidenced by the pressure in exhalation bag 10b, exceeds the ambient pressure at the valve 30 by a predetermined amount, the valve 30 will open to maintain system pressure at a predetermined value.

Figure 2:
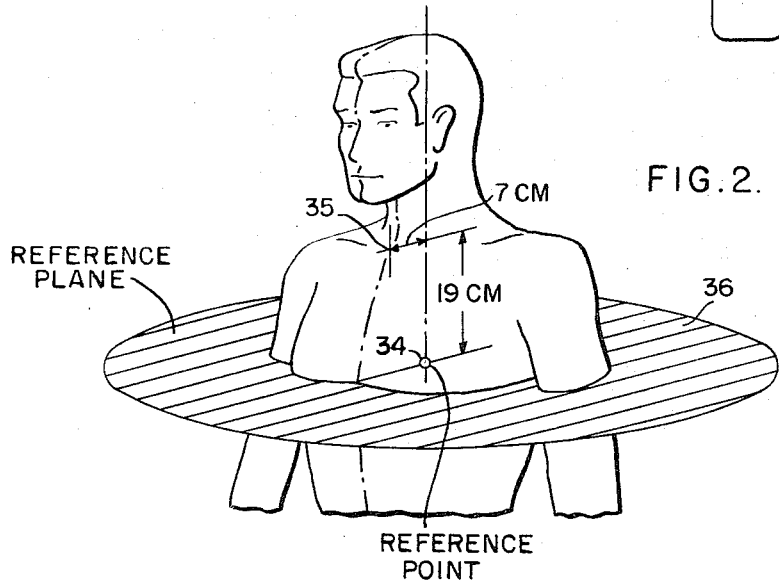
FIG. 2 is a view of a diver illustrating a certain reference point and the plane passing through that reference point.
Figure 2A:
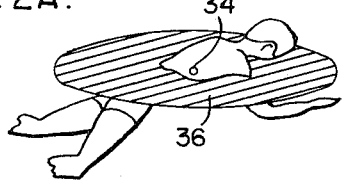
FIGS. 2A–2D illustrate the aforesaid plane in relation to various diver orientations.
Figure 2B:
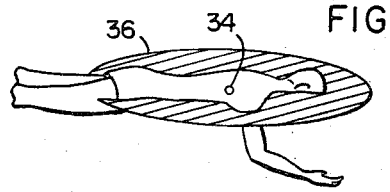
Figure 2C:
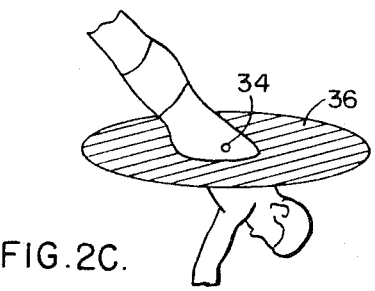
Figure 2D:
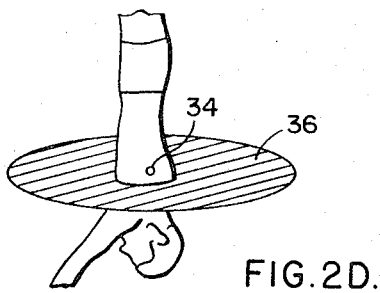

When breathing bags are incorporated into diving apparatus, the hydrostatic pressure upon the bags is transmitted to the gas space within the chest. Within upper and lower limits of the external hydrostatic pressure on the chest, there is an internal pressure, conventionally referenced to an intermediate depth point in water, which is the center of pressure. When the diver is provided with gas at this pressure, there is no net chest volume change, because the lower lobe compression and the upper lobe expansion of the lungs are balanced. This intermediate depth point in water, herein referred to as a "reference point", is sometimes referred to as the centroid of lung pressure. This reference point 34 is illustrated in FIG. 2 and is believed to be, for an average man, located, as illustrated in FIG. 2, at a point approximately 19 centimeters (cm) below, and 7 cm behind the superasternal notch 35 which is the notch at the top of the sternum or breast bone. A horizontal plane passing through this reference point is designated 36 and is herein referred to as the reference plane.

Although the present invention will be described with respect to the reference point illustrated in FIG. 2, there may, upon further study or with different diver communication means, be other points which should be matched with respect to breathing system pressure so that the term reference point as utilized herein will mean a point, referenced to a diver, the hydrostatic pressure at the depth of the point, being the most desirable breathing gas system pressure to minimize the effort required by the diver to breath.

FIGS. 2A–2D illustrate the constant horizontal orientation of the reference plane 36 with respect to various diver positions.

If a breathing bag apparatus would provide breathing gas to the diver at a pressure approximating the pressure at the reference plane 36, the diver would not have to breath under the excessive positive and negative pressure conditions prevalent in most underwater breathing apparatus incorporating breathing bags. By way of example, the exhaust valve 30 in FIG. 1 is generally a spring-loaded valve with a knob or nut that can be turned to increase or decrease the pressure in the breathing bags. At the location of the valve there is a certain ambient water pressure and the valve may be set so that it will open only when the pressure within the breathing system is equal to that ambient water pressure plus a constant spring setting. With the proper spring setting the pressure within the system can be established to be the same as the pressure at the reference plane 36 in FIG. 2. The diver then experiences minimal breathing effort as long as that positional orientation is maintained. When the diver however changes position, for example when the diver is upside down, then the system pressure is established at a value equal to the ambient pressure at the valve plus the constant setting, which would make system pressure equal to the pressure at a point hydrostatically deeper than the reference plane 36 thus requiring the diver to exert extra muscular activity in expelling the gas from his lungs.

The exhaust valve of the present invention maintains system pressure closer to the reference plane 36 than prior art exhaust valves for all positional orientations of the diver. This is accomplished by varying the spring pressure as the diver orientation is varied. In the present invention there is a force such as provided by a spring tending to close the exhaust valve and this force is aided or opposed by means of a weight. The principal of operation is illustrated in the simplified diagrams of FIGS. 3A to 3C.

Figure 3A:
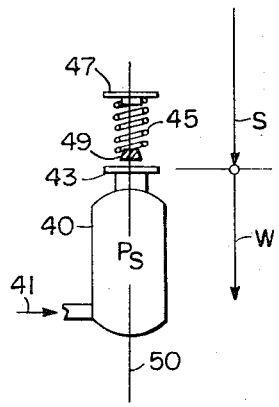
FIGS. 3A–3C basically illustrate the principal of operation of the present invention.

In FIG. 3A a container 40 is provided with gas under pressure as indicated by the arrow 41. A movable stopper 43 closes the container 40 and is urged to the closing position by means of spring 45 the force of which may be varied by means of an adjusting knob 47. The components are symmetrically disposed about central axis 50. Aiding the spring 45 in maintaining the container 40 in a closed condition is a weight 49. The force of the spring 45 and weight 49 result in an equivalent pressure tending to close the container 40. The component of pressure provided by the spring 45 is designated S and the component contributed by the weight 49 is designated W. The container 40 is in a vertical orientation and the vectors S and W are colinear and acting in the same direction whereby the pressure $P_S$ within the container 40 is maintainable at a value of S+W greater than the pressure of the ambient medium acting on stopper 43.

Figure 3B:
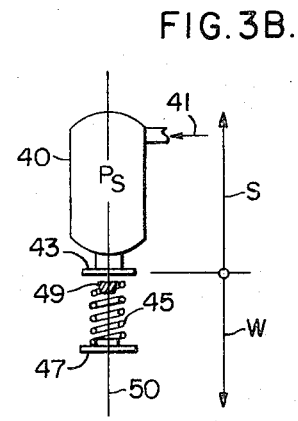

In FIG. 3B the container 40 is turned upside down such that the spring force, or pressure S is in one direction as illustrated by the vector S and the weight force, or pressure W as illustrated by the vector W, is acting in an opposite direction such that the pressure $P_S$ the container is maintained at a value of S−W greater than the ambient pressure at the stopper 43. The general case is illustrated in FIG. 3C.

Figure 3C:
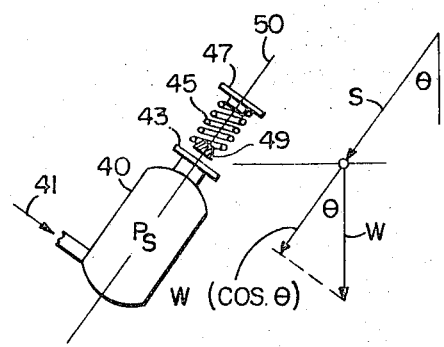

In FIG. 3C the angle $\theta$ represents the angular orientation of the apparatus (in FIG. 3A the angular orientation is 0° and in FIG. 3B the 180° position is depicted). Due to the action of gravity, the weight vector W is always acting downwardly regardless of the orientation whereas the spring vector S always acts along the axis 50. The weight vector W will always have a component acting colinearly with the spring vector S and will be of a value $W(\cos\theta)$. In other words, for any angular orientation $\theta$ the pressure $P_S$ within the container 40 is maintainable at a value of $S+W(\cos\theta)$ greater than the ambient pressure acting on the stopper 43. As soon as the pressure $P_S$ exceeds this value the stopper will open and will remain open until such time as the pressure $P_S$ reduces to the aforestated ambient pressure plus a closing pressure of $S+W(\cos\theta)$.

Figure 4:
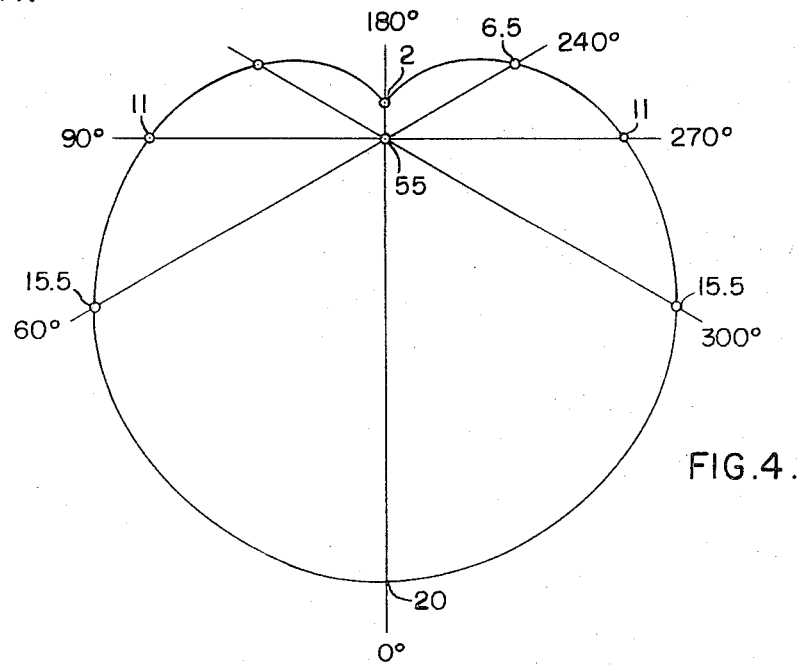
FIG. 4 is a polar plot of closing pressure versus angular orientation for the arrangement in FIG. 3C.

As the container 40 is rotated through 360°, the closing pressure will vary in accordance with the positional orientation. A polar plot of closing pressure as a function of $\theta$ is illustrated in FIG. 4. When the valve is in the upside orientation of FIG. 3B it is preferable that there be a net positive closing force. Accordingly one way of accomplishing this is by making the closing pressure S contributed by the spring greater than the pressure W contributed by the weight. The ratio of S:W may, for example, be 55/45. If the spring tension is adjusted so as to retain a pressure equivalent to 11 cm of water then the weight W will be of such value as to retain an equivalent pressure of 9 cm of water. With the valve positioned at point 55 in FIG. 4 and with an upright orientation as defined by the 0° line, the total closing pressure will be the equivalent of 20 cm of water (11 + 9). In the 180° position the total closing pressure will have a value of 2 cm (11 − 9). A few other typical values are given; for the 60° orientation the resultant closing pressure is 15.5 cm and in the 90° position the W vector acting at right angles to the S vector contributes no component to it and the total closing pressure therefore is due solely to the spring, thereby resulting in a value of 11 cm. At the 240° position the value is 6.50 cm and at the 300° position the value is the same as the 60° position, 15.5 cm.

Figure 5A:
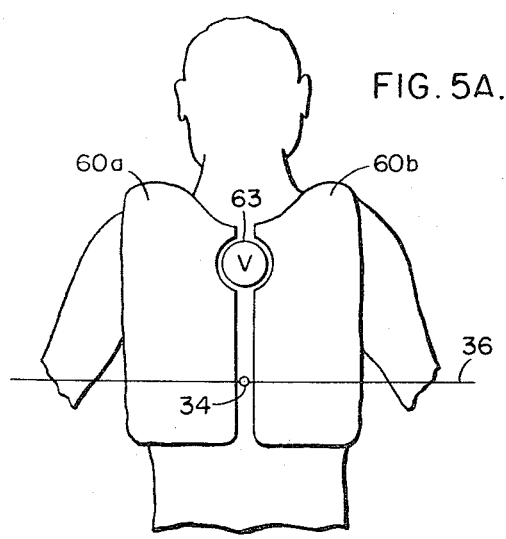
FIGS. 5A&5B are respectively, a back view and a side view of diver worn underwater breathing apparatus utilizing breathing bags.
Figure 5B:
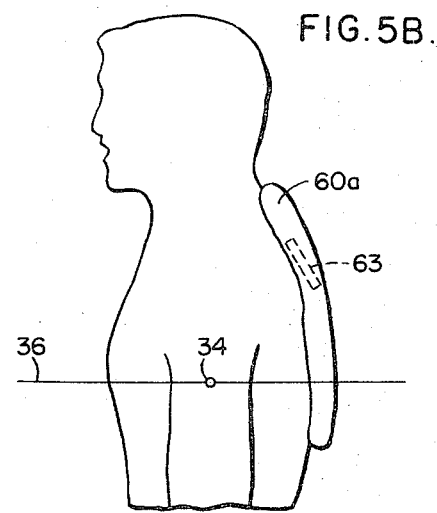
Figure 6:
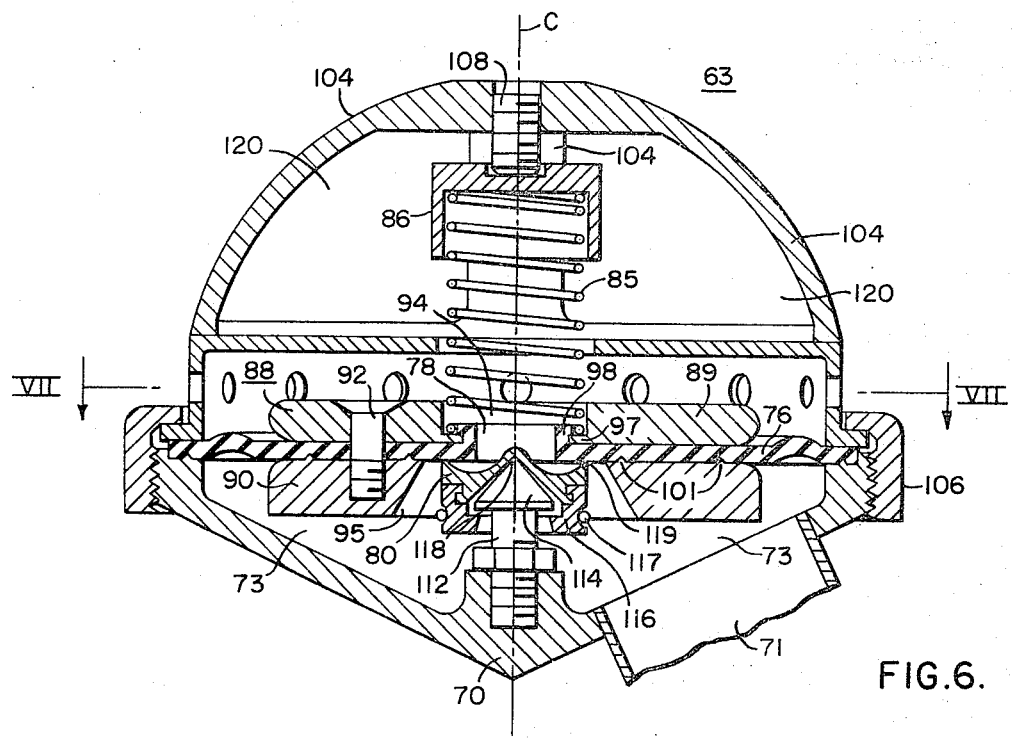
FIG. 6 is a sectional view of a preferred embodiment of the present invention.

In FIG. 5A there is illustrated a back view, and in FIG. 5B a side view of diver worn underwater breathing apparatus incorporating breathing bags 60a and 60b worn on the back of the diver and having positioned therebetween an exhaust valve 63. For a preferred embodiment of the exhaust valve 63 reference is now made to FIG. 6 illustrating a sectional view of the valve.

The valve 63 includes a valve housing 70 for connection to a pressurized portion of the breathing system, for example for connection to breathing bag 60a (FIG. 5A) by means of a passageway 71. Pressurized gas from the breathing system enters chamber 73 defined by the valve housing 70 and a movable flexible diaphragm 76 having an aperture 78 therethrough which fits over a seating means in the form of valve seat 80 being of a size to seal the aperture 78.

Exit means for the chamber is provided for allowing gas passage when the exit means is open. The exit means as formed by the diaphragm 76, aperture 78 and valve seat 80 is urged to a closed position by spring 85 the upper end of which is maintained by means of spring retainer 86. A construction is provided whereby the pressure exerted by the spring 85 is varied in accordance with positional orientation of the valve, the constructional arrangement being a weighting means connected to the flexible diaphragm 76.

When the central axis C is in a horizontal orientation, the pressure tending to close the valve, in addition to the ambient pressure is due solely to the spring pressure. In other words the weighting means does not contribute to the opening or closing of the valve in that particular orientation. If the weighting means were disposed solely on one side of the flexible diaphragm 76 there would be a possibility of affecting the closing of the valve due to a tipping moment. In order to aid in the elimination of any incorrect weight component, the weighting means accordingly includes two sections disposed on either side of the flexible diaphragm 76.

The weighting means 88 includes a first weight 89 positioned on one side of the flexible diaphragm 76 and a second weight 90 positioned on the opposite side of the diaphragm 76 and secured in place by means of, for example, screws 92. The first and second weight 89 and 90 have respective central apertures 94 and 95 with the first weight 89 having disposed in its central aperture 94 an internal flange 97 in cooperative engagement with a flange portion 98 of the flexible diaphragm 76. The lower part of the spring 85 is positioned on internal flange 97 of the first weight 89.

The cooperatively mating flanges 97 and 98 aid in preventing the connected weights 89 and 90 from moving relative to the flexible diaphragm 76. In addition, the second weight 90 is provided with a plurality of annular projections 101 which dig into the soft flexible diaphragm 76 to prevent relative movement.

Figure 7:
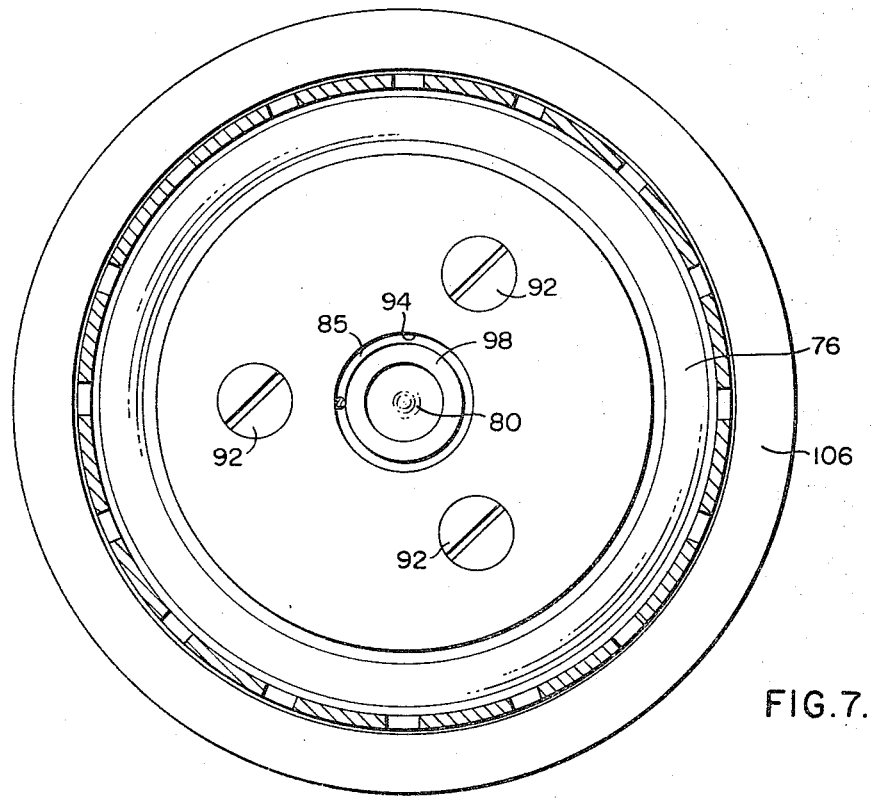
FIG. 7 is a view along line VII—VII of FIG. 6.

In order to insure that the force or pressure component provided by the weights 89 and 90 has a resultant line of action along the central axis C, the weights preferably are disposed 360° around the central axis C as illustrated in FIG. 7 which is a view along line VII—VII of FIG. 6. This may be accomplished by making each weight as one piece or a plurality of pieces symmetrically disposed about the central axis.

The valve 63 additionally includes a valve cover 104 held in place by means of retainer nut 106. A set screw 108 in the top of the valve cover 104 bears against the spring retainer 86 to vary the spring pressure urging the flexible diaphragm 76 against the valve seat 80.

In order to maintain a tight seal between the flexible diaphragm 76 and valve seat 80 even with possible small manufacturing tolerance errors, there is provided an arrangement including a pivot rod 112 having a conical head 114 on which is positioned the valve seat 80 having a conical undersurface, however of less slope than the conical head 114 so as to be pivotal thereon to a slight degree. The valve seat 80 is prevented from coming off of the conical head 114 by means of a seat clamp 116 cooperatively engaging the valve seat 80 and fabricated for example in two sections and held in position by means of retainer ring 117. The apex 118 of conical head 114 is even with, that is, in the same plane as the sealing edge 119 of valve seat 80. With the foregoing arrangement, any unsymmetrical movement of the flexible diaphragm 76 will not result in an undesired opening of the valve.

In operation, the pressure within the chamber 73 is the breathing system pressure and this is opposed by the pressure of the ambient medium 120, the closing pressure contributed by spring 85, and the closing pressure contributed by the weighting means 88. These three pressures tending to close the valve may be resolved into a single pressure (having three component parts) acting along the central axis C as measured at the plane of the flexible diaphragm 76. If the pressure within the breathing system should exceed the ambient pressure by an amount greater than the equivalent pressure S of spring 85 and equivalent pressure $W(Cos\theta)$ of weighting means 88 then the flexible diaphragm 76 will move or be forced away from the valve seat 80 and gas will flow over the valve seat 80, through aperture 78 to the ambient medium 120 and will continue to do so until such time as a balancing of the pressures is again achieved.

The valve 63 aids in maintaining the system pressure closer to the desired system pressure for various positional orientations of the diver whereas no such consideration is provided in other spring loaded valves in the prior art. FIGS. 8A–8F illustrate the diver of FIG. 5B in various positional orientations and shows the resultant system pressure obtained in comparison to the desired pressure for the valve 63 and for a prior art valve. The valve position is defined by point 55 and the valve axis C passes through the reference point 34. The distance between points 34 and 55 is in the order of 20 cm.

Figure 8A:
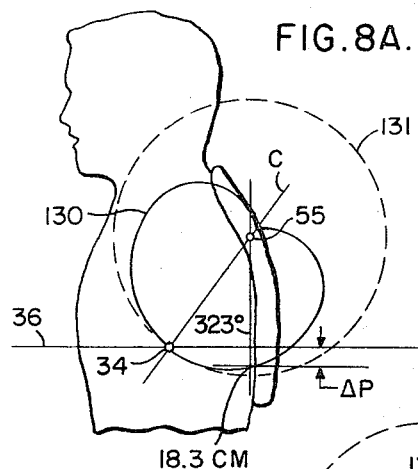
FIGS. 8A–8F illustrate different orientations of the diver in FIG. 5B.
Figure 8B:
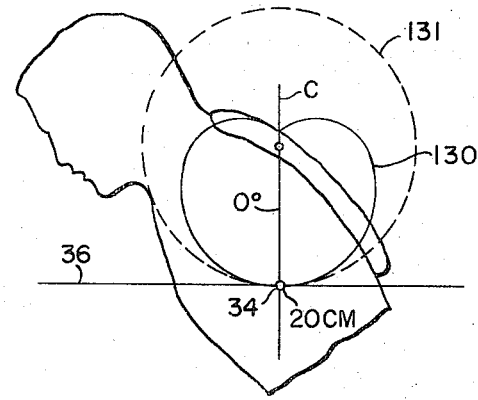

In FIGS. 8A to 8F curve 130 is superimposed in position and is the curve of FIG. 4 tilted such that the 0°0 coincides with axis C. Curve 131, shown dotted, represents a constant spring pressure of a prior art valve. For the vertical diver orientation of FIG. 8A the resultant pressure above ambient of the valve is defined by the 323° line resulting in a pressure of approximately 18.3 cm greater than the pressure at point 55. The desired system pressure is the pressure at reference plane 36, passing through reference point 34, and which is approximately 16 cm below point 55 so that in the vertical position there is only a difference $\Delta P$ of approximately 2 cm of water (equivalent pressure) between the actual and desired system pressure. By comparison, a prior art spring loaded valve set to retain the constant pressure of 20 cm would establish a system pressure 20 cm greater than the ambient pressure at point 55 and 4 cm greater than the desired pressure at reference plane 36. The small difference ($\Delta P$) however is tolerable. If the diver rotates forwardly by 37°, the 0° line for curve 130 is vertical, as depicted in FIG. 8B, and a pressure 20 cm greater than ambient pressure is established to exactly coincide with the reference plane 36, as is the case with the spring loaded prior art valve. With this position both curves 130 and 131 pass through the reference point 34 and $\Delta P$ for both valves is zero.

Figure 8C:
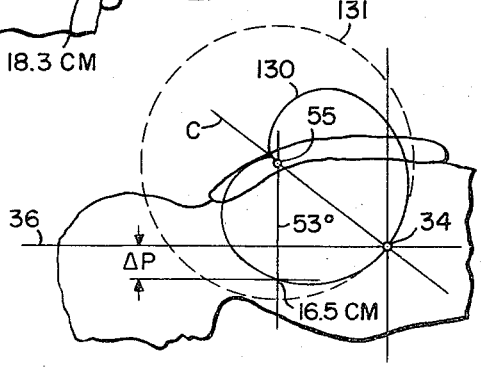

When the diver rotates to the 90° position, FIG. 8C, the resultant closing pressure above ambient is determined by the 53° line to be approximately 16.5 cm and about 4.5 cm greater ($\Delta P$) than the desired pressure at reference plane 36. For the position of FIG. 8C, curve 131 shows that a spring loaded valve establishes the system pressure at a value of approximately 8 cm of water greater than the desired pressure.

Figure 8D:
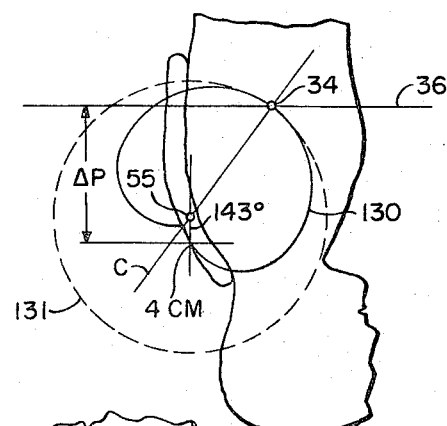

When the diver is upside down as in FIG. 8D a system pressure, as determined by the 143° line, of 4 cm more than the ambient pressure at point 55 is established. This resultant pressure is approximately 20 cm greater than the desired pressure at reference plane 36 however a corresponding spring loaded prior art valve would establish a pressure of approximately 36 cm greater.

Figure 8E:
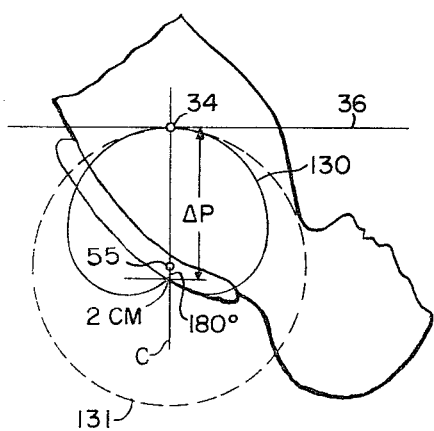

In FIG. 8E the diver is in an orientation 180° greater than the orientation of 8B and point 55 is positioned directly below reference point 34. The system pressure established by the valve of the present invention is 2 cm greater than the pressure at point 55 and 22 cm greater than the desired pressure at reference plane 36. The spring loaded prior art valve at this position would establish a maximum pressure of 20 cm greater than the pressure at point 55 and 40 cm greater than the desired pressure.

Figure 8F:
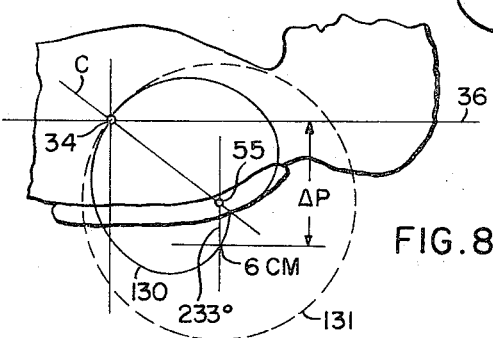

The 270° diver position of FIG. 8F results in a closing pressure equivalent to 6 cm of water greater than the ambient pressure at point 55 and approximately 18 cm greater than the desired pressure at reference plane 36. The non-position sensitive spring loaded valve would produce a system pressure approximately 32 cm greater than the desired.

Figure 9:
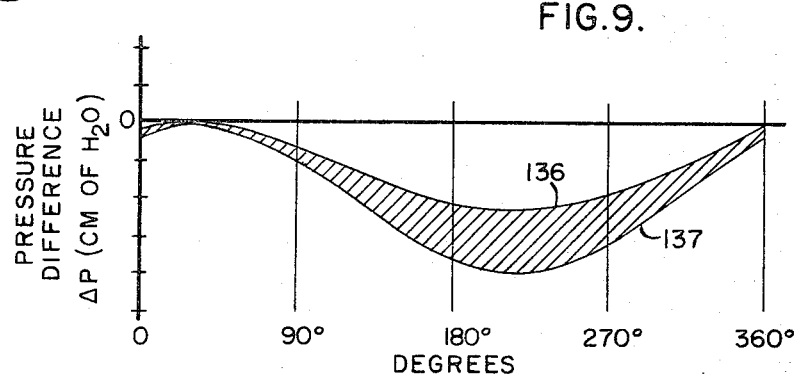
FIG. 9 is a plot representing prior art apparatus performance as compared to the apparatus of the present invention.

FIG. 9 shows the improvement obtained utilizing the orientation sensitive valve of the present invention which provides a maximum pressure over ambient equivalent to 20 cm of water, curve 136, and a spring loaded valve of the prior art set to a constant 20 meter setting, curve 137. The two curves are drawn for 360° of diver rotation as described with respect to FIGS. 8A–8F. The vertical scale represents, with the aforestated setting, $\Delta P$ the difference between actual system pressure and desired system pressure. When the diver is vertical or nearly vertical, the two curves 136 and 137 are very close and touch at one point. As diver rotation is increased however the difference between the two curves increases with the difference representing the extra muscular energy and effort required by the diver to breath.

The present invention has been described by way of example in conjunction with an underwater breathing system of the semi-closed type. It is apparent that the invention may be used in various other systems where it is desired to vary system pressure in accordance with positional orientation or with other underwater breathing systems such as the open circuit type wherein the principals set forth herein may be applied to regulators such as demand regulators. Obviously other modifications and variations of the present invention are made possible in the light of the above teachings.

I claim as my invention:

1. An exhaust valve for a diver's underwater breathing system wherein the diver breathes a pressurized gas comprising:
   A. a valve housing for connection to a pressurized portion of said system;
   B. a movable flexible diaphragm means forming a chamber with said valve housing;
   C. exit means responsive to a predetermined movement of said flexible diaphragm means for allowing escape of gas from said chamber;
   D. spring means positioned for opposing movement of said flexible diaphragm means;
   E. weighting means attached to said flexible diaphragm means for aiding or opposing said spring means in accordance with the positional orientation of said valve;
   F. said weighting means including two sections, a first of said sections being on one side of said flexible diaphragm means, the second of said sections being on the other side of said flexible diaphragm means;
   G. said second section including projections which dig into the flexible diaphragm means.

2. An exhaust valve for a diver's underwater breathing system wherein the diver breathes a pressurized gas comprising:
   A. a valve housing for connection to a pressurized portion of said system;
   B. a movable flexible diaphragm means including an aperture and forming a chamber with said valve housing;
   C. exit means responsive to a predetermined movement of said flexible diaphragm means for allowing escape of gas from said chamber;
   D. spring means positioned for opposing movement of said flexible diaphragm means;
   E. weighting means for aiding or opposing said spring means in accordance with the positional orientation of said valve;
   F. said valve housing including a valve seating means for contact with said flexible diaphragm means and disposed adjacent said aperture and being of a size to seal said aperture when in contact with said flexible diaphragm means;
   G. said exit means including said aperture and said seating means;
   H. said weighting means being in two sections, a first of said sections including an aperture surrounding the aperture in said flexible diaphragm means on one side thereof, the second of said sections including an aperture surrounding the aperture in said flexible diaphragm means on the other side thereof.

3. Apparatus according to claim 1 wherein:
   A. the flexible diaphragm means includes a flange portion surrounding its aperture;
   B. the first section includes at the lower part of its aperture, a flange portion which engages said flange portion of the flexible diaphragm means.

4. Apparatus according to claim 3 wherein:
   A. the spring means is a coil spring and which includes;
   B. a spring retainer for receiving one end of said coil spring;
   C. the other end of said coil spring being inserted in the aperture of the first section and bearing against the flange portion therein.

5. An exhaust valve for a diver's underwater breathing system wherein the diver breathes a pressurized gas comprising:
   A. a valve housing for connection to a pressurized portion of said system;
   B. a movable flexible diaphragm means including an aperture and forming a chamber with said valve housing;
   C. exit means responsive to a predetermined movement of said flexible diaphragm means for allowing escape of gas from said chamber;
   D. spring means positioned for opposing movement of said flexible diaphragm means;
   E. weighting means for aiding or opposing said spring means in accordance with the positional orientation of said valve;

F. said valve housing including a valve seating means for contact with said flexible diaphragm means and disposed adjacent said aperture and being of a size to seal said aperture when in contact with said flexible diaphragm means;

G. said exit means including said aperture and said seating means;

H. said valve seating means including a pivot rod connected to said valve housing, a conical head on the end of said pivot rod, a valve seat having a conical undersurface for placement on said conical head, the slope of said conical head being greater than the slope of said conical undersurface to allow limited pivotal movement of said valve seat.

6. Apparatus according to claim 5 wherein:

A. the valve seat includes a sealing edge which contacts the flexible diaphragm means and B. the apex of the conical head of the end of the pivot rod lies in the plane of the sealing edge.

7. An exhaust valve for a diver's underwater breathing system wherein the diver breathes a pressurized gas, comprising:

A. a valve housing for connection to a pressurized portion of said system;

B. a movable flexible diaphragm means forming a chamber with said valve housing;

C. exit means responsive to a predetermined movement of said flexible diaphragm means for allowing escape of gas from said chamber;

D. spring means positioned for opposing movement of said flexible diaphragm means;

E. weighting means for aiding or opposing said spring means in accordance with positional orientation of said valve;

F. the ratio of the closing pressure contributed by said spring means to the pressure contributed by said weighting means being approximately 55:45.

* * * * *